United States Patent [19]

Delgado

[11] 4,231,218
[45] Nov. 4, 1980

[54] RAKE WITH PIVOTABLE ARMS

[75] Inventor: Luis D. Delgado, Palencia, Spain

[73] Assignee: Vicon España S.A., Palencia, Spain

[21] Appl. No.: 734,193

[22] Filed: Oct. 20, 1976

Related U.S. Application Data

[63] Continuation of Ser. No. 546,866, Feb. 4, 1975, abandoned.

[51] Int. Cl.³ ............................................. A01D 78/04
[52] U.S. Cl. ...................................... 56/377; 56/15.8; 172/632
[58] Field of Search ............... 172/240, 310, 311, 314, 172/315, 316, 318, 320, 413, 454, 459, 476, 488, 489, 490, 497, 501, 544, 545, 557, 580, 581, 583, 584, 600, 613, 619, 631, 632, 634, 640, 644, 657, 658, 661, 662, 666, 667, 668, 669, 675; 56/366, 367, 370, 377, 395, 396, 397, 15.8; 280/43.24, 43.23; 254/113, 124

[56] References Cited

U.S. PATENT DOCUMENTS

| 2,635,367 | 4/1953 | Piel et al. ........................ 172/668 X |
| 2,683,345 | 7/1954 | Meyer .................................... 56/377 |
| 2,706,881 | 4/1955 | McDonald ...................... 172/476 X |
| 2,862,348 | 12/1958 | van der Lely et al. ............... 56/377 |
| 3,004,378 | 10/1961 | van der Lely et al. ............... 56/377 |
| 3,132,861 | 5/1964 | Horney ......................... 272/83 R X |
| 3,193,023 | 7/1965 | Adee .................................... 172/311 |
| 3,320,735 | 5/1967 | Sutherland et al. .................... 56/377 |
| 3,406,509 | 10/1968 | Wood ..................................... 56/377 |
| 3,744,573 | 7/1973 | Mellen ............................. 172/666 X |
| 3,791,673 | 2/1974 | Hornung ......................... 172/311 X |
| 3,805,503 | 4/1974 | van der Berg ......................... 56/366 |

*Primary Examiner*—Richard T. Stouffer
*Attorney, Agent, or Firm*—John P. Snyder

[57] ABSTRACT

A rake comprising a frame provided with wheels, a subframe pivotally connected with said frame, two board supports pivotally connected with the subframe and a plurality of rake boards rotatably journalled at the board supports is improved with the object that it can be readily constructed in a simple manner, that it satisfactorily matches slopes and unevennesses of the ground and that it can be readily moved at will into the operative position or a transport position.

For this purpose the subframe is formed mainly by relatively independently pivotable arms fastened to the frame.

24 Claims, 7 Drawing Figures

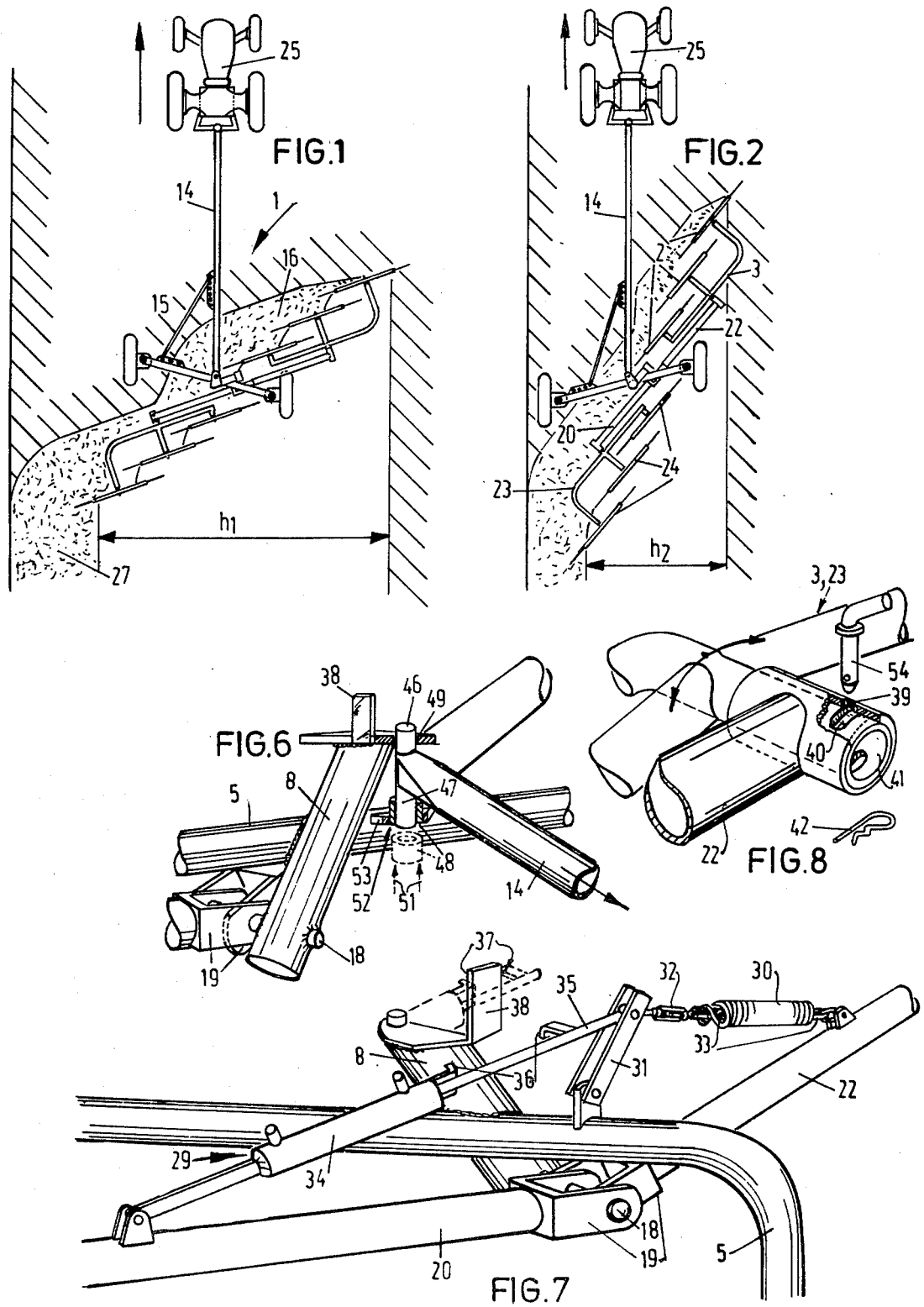

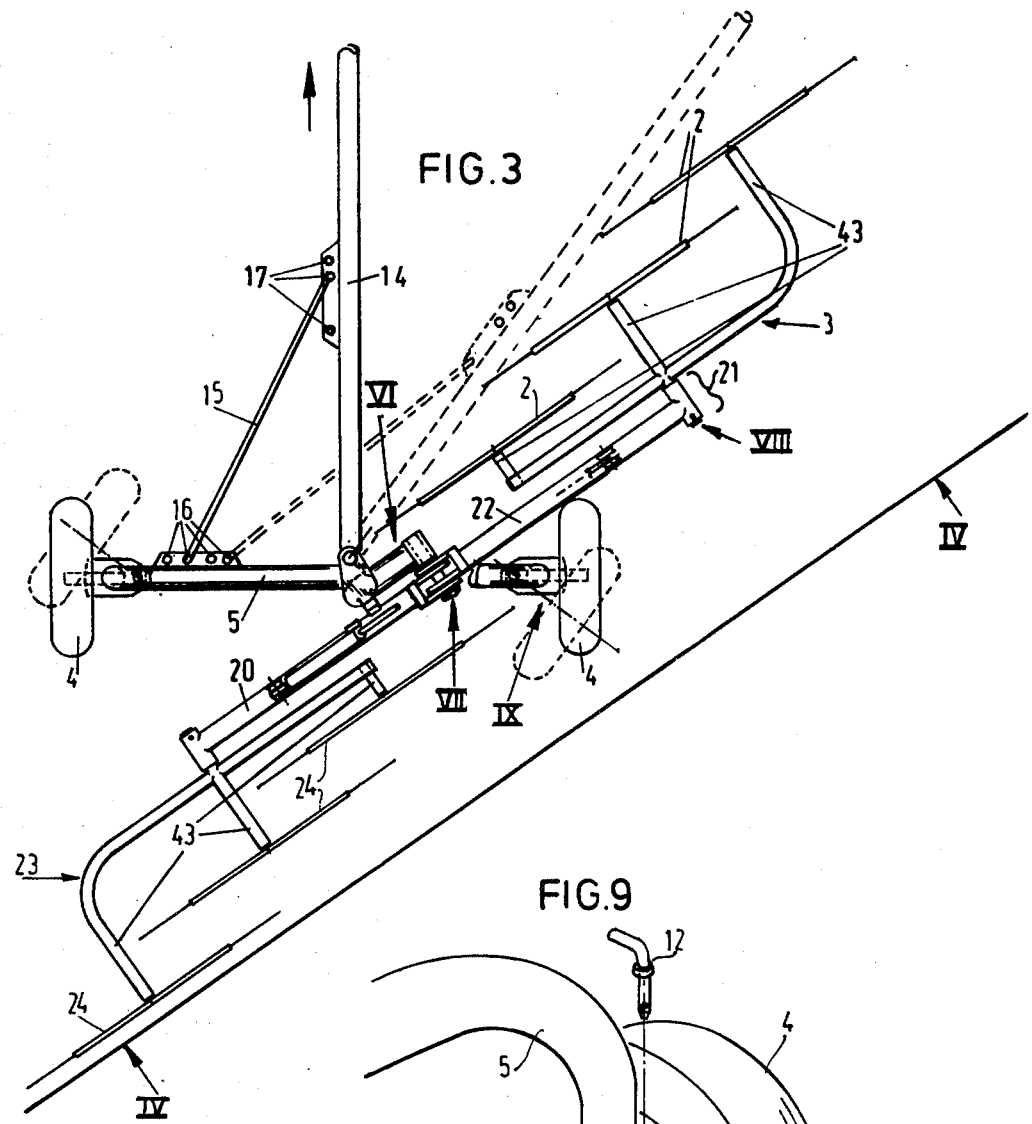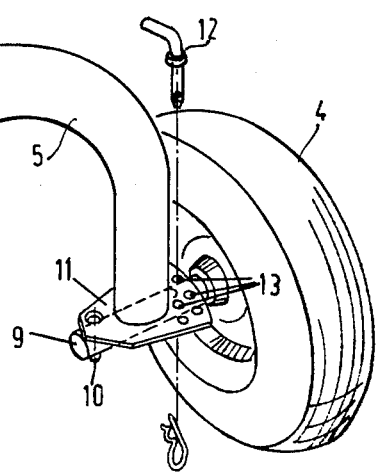

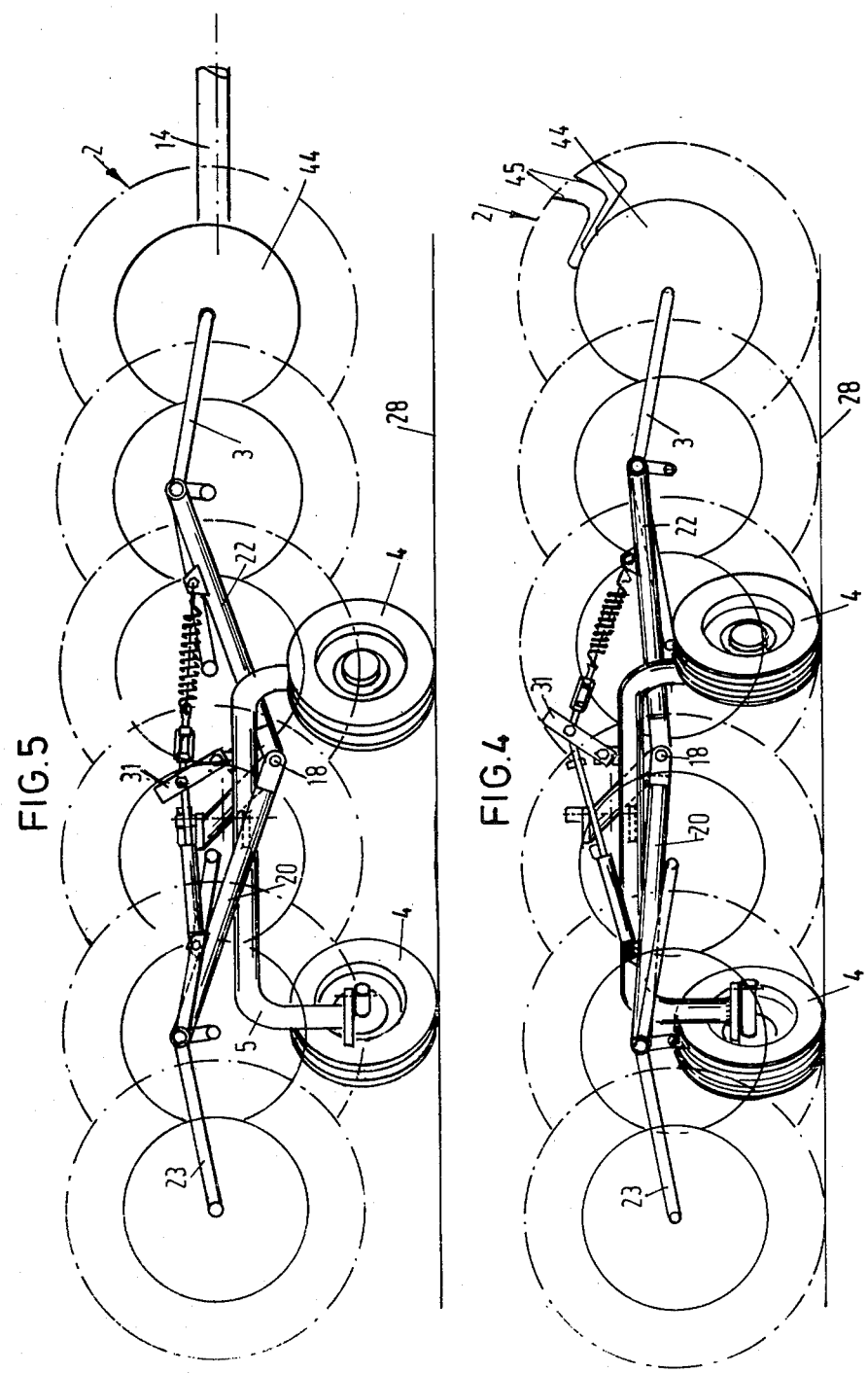

RAKE WITH PIVOTABLE ARMS

This is a continuation of application Ser. No. 546,866 filed Feb. 4, 1975, now abandoned.

The invention relates to a rake comprising at least one frame provided with wheels, a subframe pivotally connected with said frame, two board supports pivotally connected with the subframe and a plurality of rake boards rotatably journalled at the board supports.

Such a rake is known.

The invention has for its object to provide a rake of the kind set forth, which can be readily constructed in a simple manner and which satisfactorily matches slopes and unevennesses of the ground and which can be readily moved at will into the operative position or a transport position.

For this purpose the rake embodying the invention is characterized in that the subframe is formed mainly by relatively independently pivotable arms fastened to the frame.

The aforesaid and further features of the invention will be set out in the following specification with reference to a preferred embodiment of a rake in accordance with the invention.

In the drawings:

FIGS. 1 and 2 are each a schematic plan view of the rake according to the invention towed by a tractor in two different working positions, FIG. 3 is an enlarged plan view partly broken away, FIG. 4 is an elevation taken on the line IV—IV in a working position, FIG. 5 is an elevation taken on the line IV—IV in FIG. 3 in a transport position, FIG. 6 is a perspective view of a detail VI of FIG. 3, FIG. 7 is a perspective view of a detail VII of FIG. 3, FIG. 8 is a perspective view of a detail VIII of FIG. 3 and FIG. 9 is a perspective view of a detail IX of FIG. 3.

The rake 1 comprises a tubular main frame formed by a transverse beam 5 having the shape of an inverted U and extending between two wheels 4 and by a support 8 welded in inclined position to the transverse beam 5. The support 8 is provided with a horizontal stub shaft 18 projecting across the ears 19 of two arms 20 and 22, forming together a subframe 21 (see FIG. 3) pivotally connected with the frame 7. The rake 1 comprises furthermore two board supports 3 and 23 pivotally secured to the subframe 21 and a plurality of rake boards 2 and 24, rotatably arranged on the board supports 3 and 23.

FIG. 9 shows that the axle 9 of each wheel 4 is adapted to pivot around a pin 10 on a flange 11 of the transverse beam 5 after the removal of a pin 12, which is inserted, in operation, through one of the setting holes 13 and through a hole diametrically drilled into the wheel shaft 9 for determining the direction of run of the wheel 4. In a similar manner a drawbar 14 can be set in various angular positions with respect to the transverse beam 5 by means of a strut 15 by hooking the strut 15 at will into one of each series of holes 16 and 17 of the transverse beam 5 and the drawbar 14 respectively. FIG. 3 shows a working position by solid lines and a transport position by broken lines, in which the rake 1 has a minimum width for road transport.

FIGS. 1 and 2 show the rake 1 in different working positions behind a tractor 25. The effective width $h_2$ of FIG. 2 is smaller than the effective width $h_1$ of FIG. 1. The crop 26 is displaced over the effective width $h_1$ and $h_2$ by each rake board 2, 24 nearer the swath 27. The rake boards 2 and 24 can match the unevennesses and slopes of the ground 28 (see FIGS. 4,5) because the arms 20 and 22 are pivotable both with respect to the main frame and with respect to one another. The arms 20 and 22 are interconnected through a cylinder assembly 29 and a strong draw spring 30, which engage either side of an upright limb 31 pivotally secured at its lower end to the main frame. In the working position the cylinder assembly 29 is extended and the pressure of the rake boards 2 and 24 on the ground 28 is reduced by the tractive force of the strong spring 30, which force is adjustable by means of a setting member 32. The extension of the spring 30 is limited by a chain 33 located inside the spring 30. The cylinder 34 and the piston rod 35 of the cylinder assembly 29 are provided with stops 36, which co-operate with stops 37 formed by the rims of an extension 38 of the support 8 of the frame 7. When the cylinder assembly 29 is drawn in, the stops 36 clamp between them the extension 38 and thus fix the arms 20 and 22 in a lifted position on the main frame (see FIG. 5) for transport purposes.

Since the board supports 3 and 23 and the arms 20 and 22 are adapted to turn only over a limited stroke, the rake boards 2 and 24 cannot touch the ground 28 in the transport position. This pivotal stroke is limited by a detachable pin 54 (see FIG. 8), which extends through diametrally opposed holes 39 of the arms 20 or 22 and through elongated holes 40 of a tubular shaft 41 of a board support 3 or 23. The pin 54 is held in place by a safety spring 42.

The plan view of FIG. 3 shows that the board support 3 with the foremost group of rake boards 2 is arranged on the front side of the subframe 21 and the board support 23 with the hindmost group of rake boards 24 is arranged on the rear side of the subframe 21.

Each board support 3 and 23 comprises three slightly downwardly extending cranks 43 forming each a bearing for a rake board 2 and 24 respectively. The rake boards 2 and 24 are each formed by a disc 44 and resilient fingers 45 secured thereto.

The drawbar 14 directly engages by an upright stub shaft 46 a circular recess 49 of the upper flange 50 of the support 8 and by a downwardly extending stub shaft 47 a bearing bushing 48 slipped in an axial direction 51 into a recess 52 of an ear 53 of the frame 7.

What I claim is:

1. A rake comprising at least one main frame provided with wheels, a subframe pivotally connected with said main frame for up and down swinging movement relative thereto, two board supports pivotally connected with said subframe for seesaw movement relative thereto and a plurality of rake boards rotatably arranged on the board supports, characterized in that the subframe is formed mainly by relatively independently pivotable arms secured to the main frame.

2. A rake as claimed in claim 1, wherein the main frame comprises a transverse beam shaped in the form of an inverted U and extending between said wheels.

3. A rake as claimed in claim 1, including a support fixed to said main frame and wherein the subframe is pivotally connected with said main frame through said support.

4. A rake as claimed in claim 3, wherein said main frame comprises a transverse beam and said support is downwardly inclined away from said transverse beam.

5. A rake as claimed in claim 1, wherein said arms of the subframe are connected with one another through a piston and cylinder assembly and a spring.

6. A rake as claimed in claim 5, including a support fixed to said main frame and wherein the subframe is pivotally connected with said support, said main frame being provided with stationary stops which co-operate with stops of the cylinder and the piston and wherein said stops are secured to the top end of said support.

7. A rake as claimed in claim 1, wherein said arms of the subframe are connected with one another through a piston and cylinder assembly and a spring and wherein the extension of the spring is limited.

8. A rake as claimed in claim 1, wherein said arms of the subframe are connected with one another through a piston and cylinder assembly and a spring and wherein the extension of the spring is limited by a chain located inside the spring.

9. A rake as claimed in claim 1, wherein said arms of the subframe are connected with one another through a piston and cylinder assembly and a spring and wherein the main frame is provided with stationary stops which co-operate with stops of the cylinder and the piston.

10. A rake as claimed in claim 1, wherein said arms of the subframe are connected with one another through a piston and cylinder assembly and a spring and wherein said piston and cylinder assembly engages either side of an upright limb secured to the main frame.

11. A rake as claimed in claim 1, wherein one of said board supports is arranged to the front of the subframe and another of said supports to the rear side of said subframe.

12. A rake as claimed in claim 1, wherein each of said wheels is provided with an axle which can be set in various positions on the main frame.

13. A rake as claimed in claim 1, wherein each board support is adapted to pivot over a limited angle.

14. A rake as claimed in claim 1 including a drawbar pivotally attached to said main frame and an adjustable strut connecting said main frame to said drawbar whereby the angularity of said main frame relative to said drawbar may be varied.

15. A rake as claimed in claim 1 wherein each board support is provided with an elongate opening, and including a pin carried by each arm and received in an elongate opening to limit the angles through which said board supports may pivot.

16. A rake as claimed in claim 1 including a drawbar having a vertical shaft at one end presenting upper and lower stub shaft portions, and a bushing carried by said main frame receiving one of said stub shaft portions.

17. A rake as claimed in claim 1 including counterbalancing means connecting said arms for relieving some of the weight carried thereby.

18. A side delivery rake comprising, in combination:
a horizontally extending main frame adapted to be attached to a towing vehicle, said main frame presenting transversely spaced opposite end portions, a ground-engaging wheel carried by each such end portion, and pivot means fixed to said main frame between said end portions for supporting a subframe;
a subframe pivotally mounted on said pivot means, said subframe comprising a first arm pivoted about a generally horizontal axis defined by said pivot means and extending transversely in one direction from said pivot means, movement of said first arm about said pivot means defining a pivot plane of said first arm, and a second arm pivoted about a generally horizontal axis defined by said pivot means and extending transversely in the other direction from said pivot means, movement of said second arm about its pivot defining a pivot plane of said second arm, second pivot means fixed to said first arm adjacent the free end thereof for defining a pivot axis extending generally perpendicular to the pivot plane of said first arm, and third pivot means fixed to said second arm adjacent the free end thereof for defining a pivot axis extending generally perpendicular to the pivot plane of said second arm;
a first rake support attached to said first arm through said second pivot means and a second rake support attached to said second arm through said third pivot means, each rake support extending transversely on opposite sides of its pivot axis; and
a plurality of rake wheels rotatably mounted on each rake support for cumulatively covering a raking swath.

19. A side delivery rake as defined in claim 18 including counterbalancing means connected to said first and second arms for relieving some of the weight carried thereby.

20. A side delivery rake as defined in claim 19 wherein the pivot means first mentioned comprises a post fixed to said main frame and presenting upper and lower post portions disposed respectively above and below the adjacent portion of the main frame, a generally horizontal pivot pin fixed to said lower post portion and defining said pivot axis for both said first and second arms, a drawbar pivotally attached to said upper post portion, and a strut connecting said main frame to said drawbar to maintain a desired angularity between said drawbar and main frame.

21. A side delivery rake comprising, in combination:
a drawbar adapted to be attached at one end to a powered vehicle in trailing relation thereto;
a main frame of inverted, generally U-shaped configuration defining a horizontal frame bar having a depending leg at each end thereof;
means pivotally attaching the trailing end of said drawbar to a central portion of said frame bar and a link adjustably connecting said frame bar to said drawbar in triangulating relation thereto so as to dispose said frame bar at different transverse attitudes with respect to said drawbar;
a wheel carried by each leg of said main frame and means adjustably attaching each wheel to its leg whereby said wheels may track the powered vehicle at each of the different transverse attitudes of said drawbar;
pivot means fixed to a central region of said frame bar and defining at least one generally horizontal pivot axis which intersects a vertical plane containing said frame bar at an acute angle;
a first arm pivotally attached at one end to said pivot means and projecting therefrom to present a free end located forwardly with respect to said frame bar and a second arm pivotally attached at one end to said pivot means and projecting therefrom to present a free end located rearwardly with respect to said frame bar;
a first rake frame pivotally attached to said free end of the first arm and disposed forwardly thereof, said first rake frame including at least a pair of forwardly projecting legs disposed respectively inboard and outboard with respect to said free end of the first arm and a rotary rake wheel rotatably mounted at the forward end of each such leg;

a second rake frame pivotally attached to said free end of the second arm and disposed rearwardly thereof, said second rake frame including at least a pair of rearwardly projecting legs disposed respectively inboard and outboard with respect to said free end of the second leg and a rotary rake wheel rotatably mounted at the rearward end of each such leg; and counterbalancing means interconnecting said first and second arms for relieving some of the weight carried thereby.

22. A side delivery rake comprising, in combination:

a drawbar adapted to be attached at one end to a powered vehicle in trailing relation thereto, a wheel-supported elongate main frame pivotally attached to a trailing portion of said drawbar, and adjustable link means triangularly interconnecting said drawbar and said main frame for disposing said main frame at different transverse attitudes with respect to said drawbar;

a first arm pivotally attached adjacent one end thereof to said main frame and projecting therefrom to present a free end disposed forwardly with respect to said main frame and which is free to swing up and down, a first elongate rake frame pivotally attached to said free end of the first arm, between the ends of said first rake frame, whereby the ends of said first rake frame are free to seesaw with respect to said free end of the first arm, and at least one rotatable rake wheel rotatably carried by each end of said first rake frame; and a second arm pivotally attached adjacent one end thereof to said main frame and projecting therefrom oppositely with respect to said first arm to present a free end disposed rearwardly with respect to said main frame and which is free to swing up and down, a second elongate rake frame pivotally attached to said free end of the second arm, between the ends of said second rake frame, whereby the ends of said second rake frame are free to seesaw with respect to said free end of the second arm, and at least one rotatable rake wheel rotatably carried by each end of said second rake frame.

23. A side delivery rake as defined in claim 22 including counterbalancing means connecting said first and second arms for relieving some of the weight acting thereon.

24. A side delivery rake comprising, in combination:

an elongate main frame and a drawbar attached to the central region of said main frame such that said main frame extends transversely with respect to said drawbar;

a first arm pivotally attached at one end about a generally horizontal axis to said central region of said main frame and extending from said axis forwardly of said main frame to lie between said main frame and said drawbar;

a second arm pivotally attached at one end about a generally horizontal axis to said central region of the main frame and extending from such axis rearwardly of said main frame to lie on that side of the main frame opposite that side upon which said first arm lies;

a first rake frame pivotally attached to the free end of said first arm for seesaw motion relative thereto in a plane essentially parallel to said first arm;

a second rake frame pivotally attached to the free end of said second arm for seesaw motion relative thereto in a plane essentially parallel to said second arm; and a plurality of vertically disposed rake wheels pivotally carried by each of said rake frames.

* * * * *

UNITED STATES PATENT AND TRADEMARK OFFICE
CERTIFICATE OF CORRECTION

PATENT NO. : 4,231,218

DATED : November 4, 1980

INVENTOR(S) : Luis D. Delgado

It is certified that error appears in the above-identified patent and that said Letters Patent are hereby corrected as shown below:

```
   --- Foreign Application Priority Data
[30]
        February 8, 1974...Spain................423,037---
```

Signed and Sealed this

Third Day of March 1981

[SEAL]

Attest:

RENE D. TEGTMEYER

*Attesting Officer*  *Acting Commissioner of Patents and Trademarks*